May 5, 1964  L. A. WARNER  3,131,858
COMPUTER
Filed Aug. 11, 1961  2 Sheets-Sheet 2

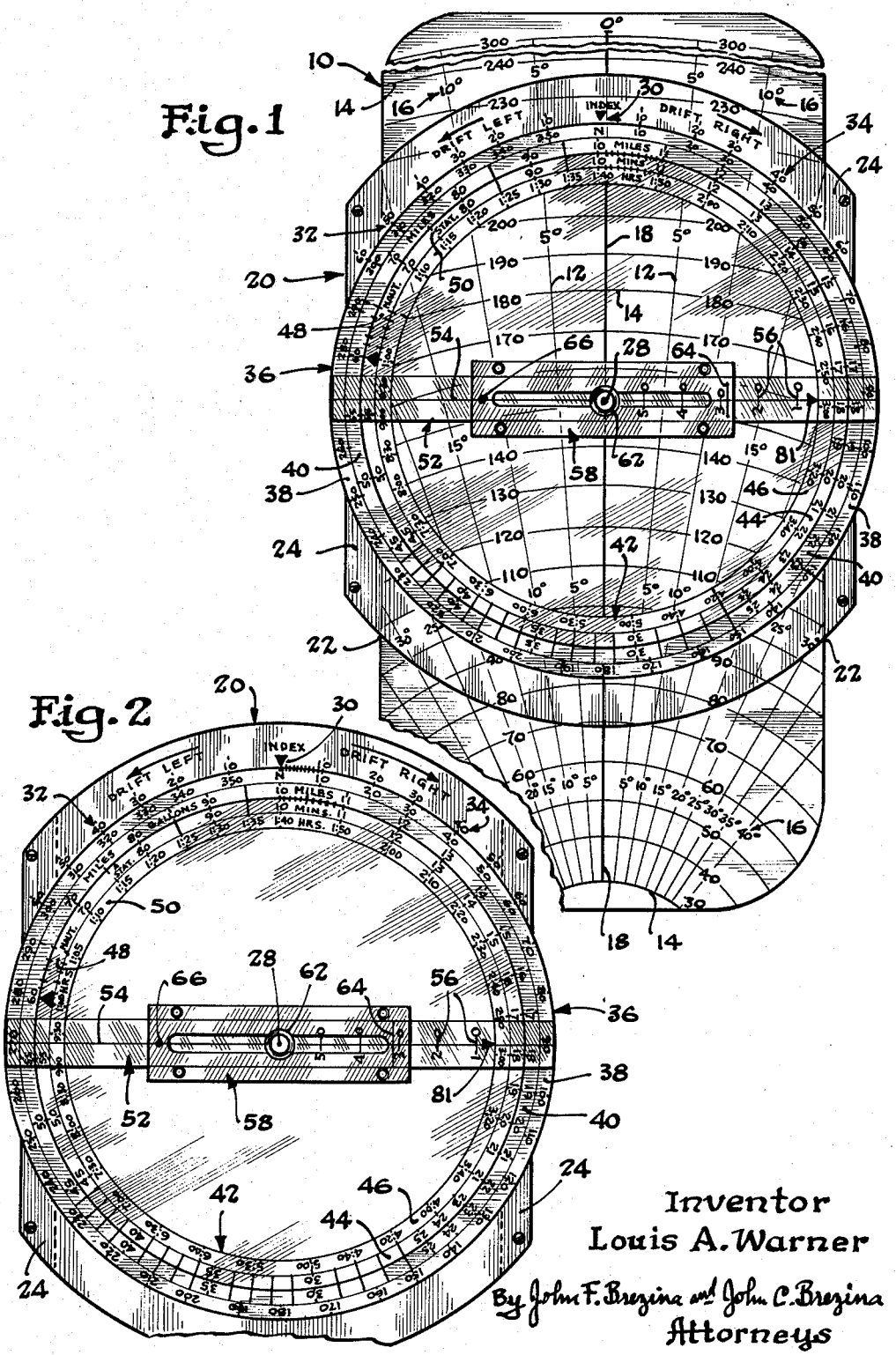

Inventor
Louis A. Warner
By John F. Brezina and John C. Brezina
Attorneys 3,131,858
COMPUTER
Louis A. Warner, 5223 N. Natoma Ave., Chicago, Ill.
Filed Aug. 11, 1961, Ser. No. 130,814
5 Claims. (Cl. 235—61)

The present invention relates to a computing device and more particularly it relates to an improved computer for solving navigation problems.

In moderate speed aircraft aerial dead reckoning is the most common method of navigation used to direct an aircraft from one position to another. In aerial dead reckoning there are six basic variables that the navigator is continually concerned with, viz.: true airspeed which is the relative speed of an aircraft through a body of air; true heading which is the direction in which the aircraft is pointed; wind speed; wind direction; ground speed which is the speed of the aircraft with relation to the ground; and true course which is the path the aircraft travels over the ground. The navigator of an aircraft has the job of pairing the six above noted quantities into appropriate vectors which are then added together to form the wind triangle which is the very heart of the dead reckoning method of aerial navigation.

The most frequently encountered problem in aerial dead reckoning is that in which the True Course, the wind direction and speed, and the aircraft's speed are known. By the graphic solution of the wind vector problem the pilot-navigator can determine what heading to fly to offset the effect of the wind drifting tendency, and what the ground speed will be. The solution of this problem is basic to all pre-flight planning, providing requisite information for the filing of flight plans and the calculation of fuel consumption requirements. In flight, the periodic revision of heading and ground speed information with changing wind conditions enables the pilot to reduce the amount of deviation from the desired course, and to correctly amend the estimates of arrival times over intermediate points or at the destination.

Another application of the graphic solution of the wind vector problem occurs when the true heading and true airspeed are known to the navigator from his instruments, i.e. the compass reading (corrected for deviation and variation) will indicate the true heading, and the airspeed indicator (corrected for altitude and temperature) will give the true airspeed. The wind direction and speed must be obtained from weather bulletins preceding and during the flight since wind conditions are constantly varying. From the above given data, which as indicated must be corrected for ambient conditions, the navigator can then solve the wind triangle and get his ground speed and true course.

The ground speed combined with the time of flight will determine the distance flown, and the direction and distance values so determined can be utilized to plot a D.R. (dead reckoning) position on the chart.

In another application of wind vector solutions, where a fix is obtained either by radio or visual observation the True Course and Ground Speed can be obtained, and from instruments within the aircraft the True Heading and Air Speed can be determined. Thus, two sides of the wind triangle are known and the third side representing the actual wind direction and speed at flight level can be computed graphically.

There are many different types of computers known that are adaptable to the solution of the various problems indicated above. All computers are directed to serve the same fundamental purpose, i.e. rapid solution of dead reckoning mathematics with the minimum attention of the navigator to the solution of the various problems.

The mathematics involved in the solution of these navigational problems is not very difficult but it is endless. The navigator must constantly be aware of how far he has traveled, in what direction the aircraft is now flying, how fast he presently is traveling (with relation to the ground), how many minutes have elapsed since his last position check, what the wind conditions are and what effect they are having upon the course and speed of the aircraft, and many other aspects of navigation. As many as 150 separate computations may be required during one flight of about 4 hours duration in order to navigate the aircraft most effectively and accurately.

Most moderate speed aircraft flown today are in private or corporate service. A great many of these aircraft are flown by one person and it usually is the case that either that person is alone in the aircraft and of necessity must perform all navigational computations while flying the craft or he is the only person qualified to fly the aircraft, if more than one person is aboard, and similarly must solve navigational problems while flying the craft.

Thus, with only one qualified pilot-navigator within the aircraft, in most instances, it becomes rather important that the pilot be able to make all computations with one hand leaving the other hand free to control and guide the aircraft. Most smaller aircraft are not equipped with automatic pilot controls to guide the plane along a predetermined course and therefore the pilot must pay strict attention to flight problems and conditions for the entire duration of the flight.

Since the pilot is required to divide his attention between piloting the aircraft and making his navigational computations it is important to assist the pilot in any manner possible in the design of a convenient computer.

An aircraft computing device, to be suitable for effective use in moderate speed aircraft must be designed such that computations may be performed with a minimum amount of effort and with reasonable simplicity. It, further, is of considerable advantage to combine into one instrument as many devices necessary to the solution of aerial navigation problems as is conveniently and reasonably feasible, without unduly complicating the device and without the sacrifice of simplicity of any of the separate computations to be performed on the computer.

The present invention is directed to an improved aerial navigation computer having a cursor and a slide operable in conjunction with said cursor to facilitate the solution of wind triangle navigation problems the computer being adapted for rapid, accurate solution of basic aerial dead reckoning navigational problems.

A primary object of the present invention is to provide an improved navigation computer which may be easily operated to correlate the variables necessary to the solution of navigational problems to permit navigation of an aircraft by dead reckoning.

It is a further object of the present invention to provide an improved navigation computer that is simply and inexpensively manufactured, durable in construction and easy to operate.

An additional object of the present invention is the provision of an improved navigation computer that may be operated with one hand to solve all navigational problems.

It is a further object of the present invention to provide an improved navigation computer that is suitable for rapid and accurate correlation of the true course, true airspeed, wind speed and wind direction to obtain accurate graphical representation of the ground speed and true heading of the aircraft for effective navigation of an aircraft.

An additional object of the present invention is to provide an improved navigation computer having a cursor and slide operably associated therewith to provide rapid and accurate graphical representation of the wind speed and direction without the use of a separate marking device, thereby facilitating one-hand operation of the computer.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a plan view of the slide member and top member in assembled relation;

FIGURE 2 is a plan view of the front side of the transparent top member;

Figure 4:
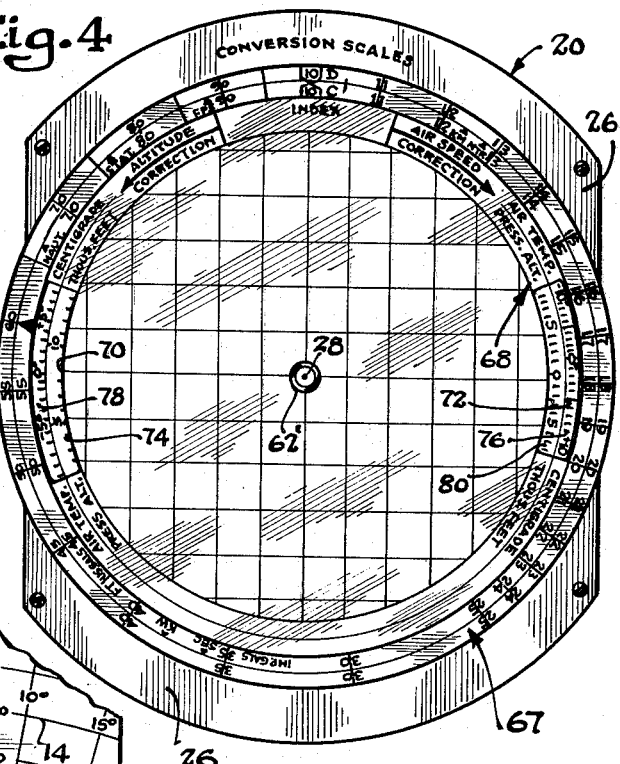
FIGURE 4 is a plan view of the top member showing in detail the conversion scales and grid lines.
Figure 3:
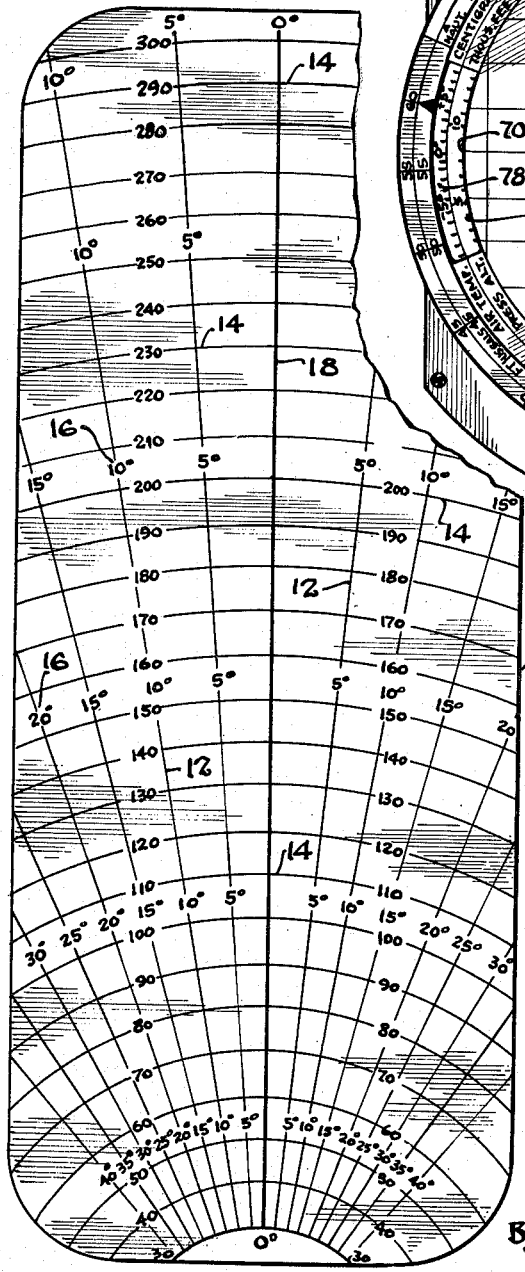
FIGURE 3 is a plan view of the front side of the rectangular slide member showing in detail the radial drift lines and the plurality of airspeed arcs.

Referring more particularly now to FIGURES 1, 2 and 3 of the drawings there is illustrated a specific embodiment of the present invention. An elongated, rectangular slide member 10 has provided on the surface thereof a plurality of radial lines and arcs, 12 and 14, respectively. The slide member 10 may be of a suitable rigid plastic material or of metal having the lines 12 and the arcs 14 indelibly impressed therein in a permanent fashion.

The radial lines 12 are identified by numerals 16, from 0° to 40° for the purposes of illustration, which lines 12 and numerals 16 are employed to indicate degrees of drift to the left or right of the center line 18 designated as the 0° drift line. Line 18 (0° drift line) is positioned on the longitudinal axis of the slide member 10.

The arcs 14 are provided at evenly spaced intervals along the front surface of the slide member 10 and are perpendicular at the respective points of intersection with each of the radial lines 12. The arcs 14 are numbered (in increasing increments of 10 for purposes of illustration) from 30 to 300 to graphically represent speed arcs.

A top member, indicated generally at 20, is mounted for translatory movement along the rectangular slide member 10. The slide member 10 is slidably positioned with respect to the top member 20 by slidable insertion into a groove 22 which groove 22 is formed between the laterally spaced front and back members, 24 and 26, respectively of the top member 20. The central axis of the member 20 is positioned such that it moves along the 0° drift line 18 when the top member 20 is moved along the slide 10.

The front face 24 of the top member 20 is provided with a plurality of scales rotatable about a central axis 28. Face 24 of the top member 20 is provided with an index 30. The index 30 is centered on an arc 32 which arc is provided with a variation or drift scale. The drift scale arc 32 is provided with identifying numerals 34 thereon at 10° intervals about the periphery of said arc to provide a convenient reference for drift to the right or left.

A disc member 36, rotatable about the central axis 28 has an outer and an inner scale, 38 and 40 respectively, impressed thereon. The outer scale 38 is a conventional compass rose calibrated in angular degrees about the outer periphery of the member 36. The inner scale 40 is one scale of a conventional logarithmic circular slide rule and has the logarithmic scale impressed thereon.

A second disc member 42, rotatable about the central axis 28, is provided immediately inboard and adjacent to the disc member 36. Disc member 42 is provided with an outer and an inner scale, 44 and 46 respectively. The outer scale 44 is the second scale of a conventional logarithmic circular slide rule and is adapted to rotate relative to slide 36 and scale 40. It is readily seen that circular scales 40 and 44 provide a circular slide rule for convenient calculations of navigational problems. Circular scale 44 is additionally provided with convenient indices 48 and 50 for conversion from nautical to statute miles and vice versa is a time scale.

A cursor 52 is pivotally mounted on the central axis 28 of face 24 and has a "hair-line" 54 impressed along the longitudinal axis thereof to facilitate use of scale 40 and 44 as a conventional circular slide rule. The cursor 52 is also provided with a series of markings 56 in a decreasing series from the central axis 28 to one end thereof, which markings graphically represent wind speed.

A cursor slide 58 is mounted for translatory movement longitudinally of the cursor 52. The cursor slide 58 has a central slot running longitudinally thereof which is adapted to receive the mounting washer 62 of the central axis 28 in sliding relation.

The cursor 58 has two markings 64 and 66 thereon on opposite sides of the central axis 28 and equi-distant from said axis. The marking 64 is provided on the cursor slide 58 on the same side of the central axis 28 as are the markings 56 on the cursor 52 so as to be in adjustable mating relation therewith. The marking 66 is a dot or circular impression and is utilized as hereinafter described.

The back face 26 of the top member 20 is likewise provided with a pair of relatively rotatable disc members 67 and 68 which members are cooperatively associated to function as a circular slide rule.

Openings 70 and 72 are provided in the face of the smaller disc member 68, which overlies the larger disc 67, to expose reference scales 74 and 76, respectively on the latter, when said member 68 is in proper angular position with respect to said scales. Reference scale 74 is indexed to represent the flight level pressure altitude in thousands of feet and scale 76 is indexed to represent air temperature in degrees centigrade. Additional scales 78 and 80 representing air temperature in degrees centigrade and pressure altitude in thousands of feet, respectively, are provided on the face of the member 68 and are adapted to correspond with scales 74 and 76, respectively, for air speed and altitude computations.

The operation of the computer for the solution of navigational problems is more readily understood in conjunction with FIGURES 1, 2 and 3.

Initially the true course, which is the path it is desired to have the aircraft travel with respect to the ground, is selected on the compass rose 38. The figure on the compass rose 38 which represents the angular course which the plane must traverse is set opposite the true index 30, shown in FIGURE 2. The cursor slide 58 is then moved along the cursor 52 until the mark 64 coincides exactly with the wind speed, as given from the weather bulletins. The hair line 54 of the cursor 52 is then positioned, with respect to the compass rose 38, such that it coincides with the direction from which the weather bulletin indicated the wind is blowing. The arrow 81 on the cursor 52 is positioned to indicate the wind direction and facilitates computation in that an error is less likely to occur as a result of the pilot-navigator displacing the cursor 180° from its correct position. The top member 20 is then moved along the slide 10 until the dot 66 on the cursor slide 58 lies on the true or corrected air speed arc (the true airspeed being the indicated air speed corrected for temperature and pressure). The position of the dot 66 then indicates the drift angle of the aircraft, the drift angles being represented, as indicated above, by the radial lines 12 and identifying numerals 16. The ground speed is then read under the center axis 28 of the face 24, on slide 10 at the intersection of line 18 and the speed arc 14.

The chief advantage of the computer of the present invention over those currently employed in navigation is in the rapidity and simplicity of the calculations. It will be noted that it is no longer necessary, for example, to index the compass rose twice; once to plot the wind vector and the second time to index the true course. The prior art computers, in addition to requiring the indexing of the compass rose twice (with the added probability of introducing an error) required that the wind vector be plotted and identified by a pencil mark or some other separate marking means. This, of course, required the pilot-navigator to use both hands while making the navigational computations for true heading and ground speed. The resultant inattention to the guidance of the aircraft while solving the numerous navigational problems gave rise to a hazardous and generally unsatisfactory situation. The present invention is directed to a navigational computer that may conveniently be operated with one hand for the solution of navigational problems of the type illustrated and thus the pilot-navigator may still give adequate attention to control of the aircraft at all times.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. A plotting and computing device for solving wind vector problems comprising: an elongated rectangular slide member having indicia consisting of a plurality of radial lines and arcs thereon and representing a portion of a polar graph; a top member positioned on said rectangular member for slidable translatory movement therealong, said member having a transparent central portion; fastening means located in the center of said transparent portion of the top member; a 360° compass rose rotatably mounted by the fastening means with respect to the top member; cursor means rotatably mounted by the fastening means on the axis of said transparent top member and compass rose, said cursor means having a plurality of markings thereon in decreasing series from the center of said cursor means to one end thereof, said markings adapted graphically to represent wind speed; and a cursor slide member mounted on said cursor means for sliding movement therealong, said cursor slide member having a first marking adjacent one end thereof to overlie said wind speed markings on the cursor means and second marking adjacent the other end thereof, said cursor means and cursor slide member providing means to graphically represent the wind direction and speed.

2. A plotting and computing device for solving wind vector problems comprising: an elongated rectangular slide member having indicia consisting of a plurality of radial lines and arcs thereon and representing a portion of a polar graph; a top member positioned on said rectangular member for slidable translatory movement therealong, said member having a transparent central portion; fastening means located in the center of said transparent portion of the top member; a circular member having indicia representing a 360° compass rose rotatably mounted by the fastening means with respect to the top member; cursor means pivotally mounted by the fastening means on the axis of said transparent top member and compass rose, said cursor means having a plurality of markings thereon in decreasing series from the center of said cursor means to one end thereof, said markings adapted graphically to represent wind speed; and a cursor slide member mounted on said cursor means for sliding movement therealong, said cursor slide member having a first marking adjacent one end thereof to overlie said wind speeds markings on the cursor means and second marking adjacent the other end thereof, said cursor means and cursor slide member providing means to graphically represent the wind speed by relative longitudinal movement and to represent wind direction by relative rotational movement with respect to the compass rose.

3. A plotting and computing device for solving wind vector problems comprising an elongated rectangular slide member having indicia consisting of a plurality of radial lines and arcs thereon and representing a portion of a polar graph; a top member positioned on said rectangular member for slidable translatory movement therealong, said member having a transparent central portion and an indicia representing a 360° compass rose on its periphery; fastening means located in the center of said transparent portion of the top member; a circular member having indicia representing a 360° compass rose rotatably mounted by the fastening means with respect to the top member; cursor means pivotally mounted by the fastening means on the axis of said transparent top member and compass rose, said cursor means having a plurality of markings thereon in decreasing series from the center of said cursor means to one end thereof, said markings adapted graphically to represent wind speed; and a cursor slide member mounted on said cursor means for sliding movement therealong, said cursor slide member having a first marking adjacent one end thereof to overlie said wind speed markings on the cursor means and second marking adjacent the other end thereof, said cursor means and cursor slide member providing means to graphically represent the wind direction and speed and to coact with the indicia on the rectangular slide to give graphic solutions to vector triangle problems.

4. A plotting and computing device for solving wind vector problems comprising: an elongated rectangular slide member having indicia consisting of a plurality of radial lines and arcs thereon and representing a portion of a polar graph; a top member positioned on said rectangular member for slidable translatory movement therealong, said member having a central portion through which the rectangular slide may be seen; fastening means located in the center of said central portion of the top member; a 360° compass rose rotatably mounted by the fastening means with respect to the top member; cursor means rotatably mounted by the fastening means on the axis of said transparent top member and compass rose, said cursor means having a plurality of markings thereon in decreasing series from the center of said cursor means to one end thereof said markings adapted graphically to represent wind speed; and a cursor slide member mounted on said cursor means for sliding movement therealong, said cursor slide member having a first marking adjacent one end thereof to overlie said wind speed markings on the cursor means and second marking adjacent the other end thereof, said cursor means and cursor slide member providing means to graphically represent the wind direction and speed and to coact with the indicia on the rectangular slide to give graphic solutions to vector triangle problems.

5. A plotting and computing device for solving wind vector problems comprising an elongated rectangular slide member having a plurality of radial lines and arcs thereon representing a portion of a polar graph; a top member positioned on said rectangular member for slidable translatory movement therealong, said member having a transparent central portion; fastening means located in the center of said transparent portion of the top member; a 360° compass rose mounted by the fastening means rotatably with respect to the top member and having common axis therewith; cursor means pivotally mounted by the fastening means on the axis of said transparent top member and compass rose, said cursor having a plurality of markings thereon in decreasing series from the center of said cursor means to one end thereof, said markings adapted graphically to represent wind speed corresponding in magnitude to the indicia appearing on the elongated rectangular slide; and a cursor slide member mounted on said cursor means for sliding movement therealong said cursor means and cursor slide member providing means to graphically represent the wind direction, and speed.

References Cited in the file of this patent

UNITED STATES PATENTS

| | | |
|---|---|---|
| 2,756,929 | McGee | July 31, 1956 |
| 2,823,857 | Heitor | Feb. 18, 1958 |
| 2,953,298 | Peterkin | Sept. 20, 1960 |

FOREIGN PATENTS

| | | |
|---|---|---|
| 156,934 | Australia | June 7, 1954 |